United States Patent [19]

Krump

[11] 4,177,923

[45] Dec. 11, 1979

[54] BATTERY OPERATED THERMOSTAT TIMER WITH BATTERY CHARGING CIRCUITS

[75] Inventor: Robert C. Krump, Waterloo, Ill.

[73] Assignee: Emerson Electric Co., St. Louis, Mo.

[21] Appl. No.: 933,217

[22] Filed: Aug. 14, 1978

Related U.S. Application Data

[63] Continuation of Ser. No. 800,508, May 25, 1977, abandoned.

[51] Int. Cl.² ............................ H02J 7/00; F23N 5/20
[52] U.S. Cl. ..................................... 236/46 R; 307/66
[58] Field of Search ............................ 165/12; 307/66; 236/46 R, 47; 337/302, 303; 318/441

[56] References Cited

U.S. PATENT DOCUMENTS

| | | | |
|---|---|---|---|
| 3,214,670 | 10/1965 | Schaf | 307/66 X |
| 3,620,448 | 11/1971 | Nelson | 219/492 |
| 3,948,441 | 4/1976 | Perkins et al. | 236/46 R |
| 3,989,928 | 11/1976 | Scragg et al. | 219/492 |
| 4,054,245 | 10/1977 | Bennestsen et al. | 307/66 X |

Primary Examiner—William E. Wayner
Attorney, Agent, or Firm—Charles E. Markham

[57] ABSTRACT

A space thermostat for switching electrically operated space conditioning apparatus includes an electrically operated timer functioning to periodically change the temperature "set point" of the thermostat, a small rechargeable storage battery for operating the timer, and circuit means all contained within the thermostat casing for charging the battery when the thermostat contacts are closed. In a second form, circuit means all contained within the thermostat casing is provided for continuously charging the battery when the thermostat contacts are open or closed.

4 Claims, 2 Drawing Figures

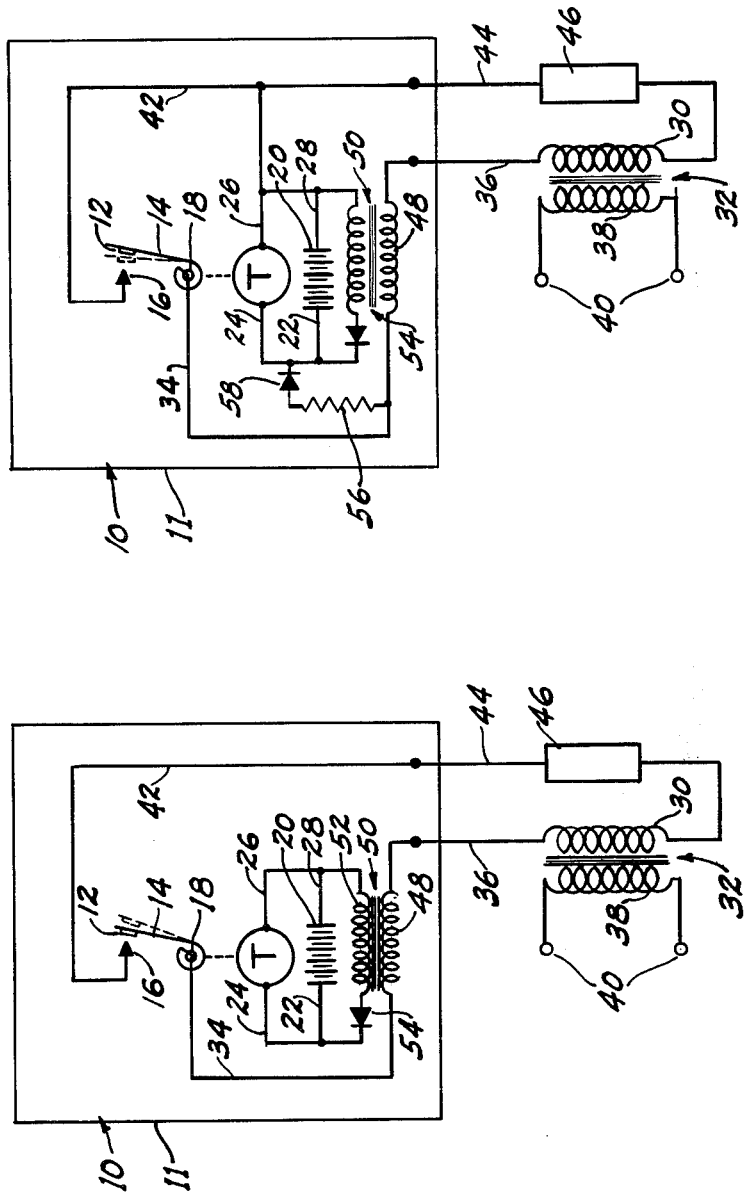

BATTERY OPERATED THERMOSTAT TIMER WITH BATTERY CHARGING CIRCUITS

This is a continuation, of application Ser. No. 800,508 filed May 25, 1977, now abandoned.

This invention relates generally to timer controlled space thermostats which include a small storage battery for operation of the timer and more particularly to circuit means for maintaining a charge on the battery.

BACKGROUND OF THE INVENTION

Timer controlled thermostats which alternately maintain a space temperature at one level for a predetermined time interval and then at another level for a predetermined time interval are well known. In the past timers employed for this purpose were usually spring driven escapement movements or synchronous motor driven gear trains. More recently, however, considerably more compact and more accurate electronic timers with constant frequency pacing elements are being employed. Such electronic timers usually operate on a D.C. power supply and consume a relatively small amount of energy and may be operated satisfactorily on a very small storage battery provided the battery is rechargeable and circuit means for maintaining a charge thereon is provided.

Due to increasing public awareness of the necessity of conserving energy, there is currently a growing demand for replacement of existing conventional space thermostats with timer-controlled space thermostats so that the rate of heating or cooling of a space during selected periods of a day may be cut back in order to conserve energy. Obviously, it is highly desirable to provide a continuous electrical power supply to the electrically operated timer so that the selected cut-back periods of heating or cooling may be accurately maintained.

Conventionally space thermostats are positioned remotely from the space conditioning apparatus which they control and from the usual commercial A.C. power source which operates the space conditioning apparatus. Also, space thermostats are conventionally connected in series with the remote power source and either directly or through remote relay means with the space conditioning apparatus. Further, any temperature limiting switches which may be required are also conventionally connected in series with the space thermostat. Because of this, the electrical power supply to the electrically operated timer of a replacement timer-controlled space thermostat would be interrupted by any temporary failure of the usual commercial power supply or by the opening of any temperature limiting switch if the timer were operated on the commercial power supply and, therefore, some other electrical power source is desirable to provide an uninterrupted electrical power supply for the timer.

To provide an uninterrupted electrical power supply for the timer a small rechargeable storage battery positioned within the thermostat casing has been employed, and means for charging the battery only when the thermostat contacts are open has been proposed. By providing circuit means within the thermostat casing for charging the battery, a replacement timer controlled thermostat could be installed by the average homeowner without the necessity of stringing additional wiring from the remote power source. In the proposed arrangement for charging the battery only when the thermostat contacts are open, the charging circuit is connected across the thermostat contacts and a charging potential is applied to the battery only when the thermostat contacts are open. When the thermostat contacts are closed in this arrangement, the charging circuit is effectively shorted out. See U.S. Pat. No. 3,948,441.

Under conditions of use in which the thermostat contacts are closed to effect operation of space conditioning apparatus for considerably longer periods than they are open, it is desirable to apply a charging potential to the battery during periods when the contacts are closed. Also, under conditions in which the relative lengths of the periods during which the thermostat contacts are closed and open change substantially and frequently due to climatic changes, it is desirable to constantly apply a charging potential to the battery whether the contacts are closed or open to insure that a charge on the small battery is maintained.

OBJECTS OF THE INVENTION

Accordingly, it is an object of this invention to provide a timer controlled space thermostat incorporating within its casing an electrically operated timer for periodically changing the temperature set point of the thermostat, a small rechargeable storage battery for operation of the timer, and circuit means within the thermostat casing for applying a charging potential to the battery when the thermostat contacts are closed.

A further object is to provide a timer controlled space thermostat incorporating within its casing an electrically operated timer, a small rechargeable storage battery for operation of the timer, a thermostatically switched portion of a circuit connecting remote space conditioning apparatus with a remote electrical power source, and a charging circuit for the battery inductively connected to the thermostatically switched circuit portion.

A further object is to provide a timer controlled space thermostat incorporating within its casing an electrically operated timer, a small rechargeable battery for operation of the timer, and a thermostatically switched portion of a circuit connecting remote space conditioning apparatus with a remote power source, and circuit means for continuously applying a charging potential to said battery having both direct connection and inductive coupling with the thermostatically switched circuit portion.

Other objects and advantages will appear from the following description when read in connection with the accompanying drawing.

In the drawing:

FIG. 1 is a diagrammatic view of a timer controlled thermostat constructed according to the invention, incorporating a battery operated timer and a battery charging circuit inductively coupled to the internal thermostat circuit; and FIG. 2 is a diagrammatic view of a second form of timer controlled thermostat having a battery operated timer, a battery charging circuit directly connected to the internal thermostat circuit, and a charging circuit inductively coupled to the internal thermostat circuit.

DESCRIPTION OF THE THERMOSTAT SHOWN IN FIG. 1

Referring to FIG. 1 of the drawing, a timer controlled space thermostat having a casing 11 is generally indicated at 10. Thermostat 10 includes within the casing 11 a movable contact 12 carried at the outer end of a bimetal coil 14 and a stationary contact 16. The bimetal coil 14 is mounted at its inner end on a rotatable post 18. An electrically operated timer T, also positioned within casing 11, is mechanically connected to rotatable post 18 and functions to alternately adjust the post 18 rotatably and therefore the inner end of the bimetal coil in one direction and then the other at selected time intervals thereby to periodically alter the temperature "set point" of the thermostat.

A small rechargeable storage battery 20 included in casing 11 supplies constant D.C. electric power for operation of the timer T through leads 22, 24, 26, and 28. The inner end of bimetal coil 14 is connected to one side of the secondary winding 30 of a remotely situated voltage step down transformer 32 by an internal lead 34 and an external lead 36. Transformer 32 has a primary winding 38 connected across A.C. commercial power source terminals 40. The stationary thermostat contact 16 is connected to the other side of transformer secondary 30 through an internal lead 42, an external lead 44 and an electrically operated means 46 controlling operation of space conditioning apparatus.

Connected in the internal lead 34 in series with the thermostat contacts 12 and 16 is the primary winding 48 of a transformer 50. The secondary winding 52 of transformer 50 is connected across the storage battery 20 in series with a diode 54 and forms a power source for charging battery 20 when the thermostat contacts 12 and 16 are closed. Preferably transformer 50 is a saturable type transformer having an output which does not exceed that suitable for charging battery 20. It will be understood that another type of transformer 50 having an output proportional to the current flow change in the primary winding may be employed. However, when using this type of transformer it may be necessary to include a resistor in series with the secondary to limit the output.

OPERATION OF THE THERMOSTAT IN FIGURE 1

The timer controlled space thermostat illustrated diagrammatically in FIG. 1 is shown in a satisfied condition. That is, the space temperature to which the bimetal coil responds has not varied sufficiently from the instant temperature "set point" of the thermostat to result in the closing of contacts 12 and 16 to effect operation of space conditioning apparatus. The instant temperature "set point" of the thermostat is determined by the timer T. When the bimetal mounting post 18 is rotated by timer T so that the contacts 12 and 16 are spaced as shown in solid line at some reference space temperature, it will require less change in space temperature to effect closing of the contacts than when the mounting post 18 is rotated by timer T so that the contacts 12 and 16 are spaced as shown in dotted line at the same reference space temperature. The temperature change required to close the contacts from the dotted line position will therefore be greater.

When the contacts 12 and 16 are open as shown, the timer T is driven by battery 20 and transformer 50 is inoperative to supply current for charging battery 20. When the contacts 12 and 16 close an adequate supply of rectified A.C. power is provided to charge battery 20. The storage battery acts to filter the unidirectional current passing diode 54.

DESCRIPTION OF THE THERMOSTAT SHOWN IN FIG. 2

The thermostat shown in FIG. 2 is similar in all respects to the thermostat shown in FIG. 1 except for the addition of means for supplying electrical energy for charging battery 20 when the thermostat contacts are open. This means takes the form of a resistor 56 and a diode 58 connected in series with battery 20 and timer T and in parallel with contacts 12 and 16 between internal leads 34 and 42.

OPERATION OF THE THERMOSTAT SHOWN IN FIG. 2

The operation of the thermostat shown in FIG. 2 is similar to that of the thermostat shown in FIG. 1 except that electrical energy to charge battery 20 is additionally supplied through resistor 56 and diode 58 when thermostat contacts 12 and 16 are open. The resistor 56 is of such value as to limit the voltage and current to that suitable for charging battery 20.

It will be understood that other arrangements than shown in FIGS. 1 and 2 for changing the temperature set point by the timer may be employed and are currently in use. For example, two thermostatic switches having diverse predetermined temperature set points may be employed with a timer operated, double throw switch for periodically connecting one and then the other of the thermostatic switches in series with space conditioning apparatus. In such arrangement, the resistor 56 and diode 58 are connected in series with battery 20 and in parallel with both thermostatic switches. Also, in space thermostats for controlling both heating and cooling apparatus wherein one or more double throw thermostatic switches are employed, the resistor 56 and diode 58 are connected in series with the battery 20 and with both heating and cooling apparatus and in parallel with the thermostatic switches.

I claim:

1. In a timer controlled space thermostat for switching a circuit connecting remote space conditioning apparatus with a remote A.C. power source, electrically operated timer means for periodically changing the temperature set point of said thermostat, a rechargeable battery for operation of said timer means, charging means for said battery comprising a transformer having a primary winding in said circuit and a secondary winding connected across said battery, current rectifying means connected in series with said secondary winding and said windings being so connected as to be only energized when the thermostat is closed.

2. The timer controlled thermostat claimed in claim 1 in which said transformer includes saturable core means to limit the current flow in the secondary circuit.

3. The timer controlled thermostat claimed in claim 1 having a casing enclosing a portion of said circuit, said timer means, said battery, and said transformer.

4. In a timer controlled space thermostat, a casing, circuit means connecting remote space conditioning apparatus with a remote A.C. power source and including a thermostatically switched portion thereof in said casing, an electrically operated timer in said casing for periodically changing the temperature set point of said thermostat, a rechargeable storage battery in said casing for operating said timer, and means for charging said battery only when said thermostatically switched portion of said circuit is completed comprising a charging circuit in said casing inductively coupled to said circuit portion and including said battery and current rectifying means.

* * * * *

Notice of Adverse Decision in Interference

In Interference No. 101,506, involving Patent No. 4,177,923, R. C. Krump, BATTERY OPERATED THERMOSTAT TIMER WITH BATTERY CHARGING CIRCUITS, final judgment adverse to the patentee was rendered Aug. 19, 1986, as to claims 1-4.

[*Official Gazette December 2, 1986.*]